United States Patent [19]
Urness

[11] Patent Number: 6,000,075
[45] Date of Patent: Dec. 14, 1999

[54] HANDLE ENGAGABLE WITH A GRID STRUCTURE

[75] Inventor: Randall J. Urness, Plover, Wis.

[73] Assignee: Sunrise Medical CCG Inc., Stevens Point, Wis.

[21] Appl. No.: 09/064,479

[22] Filed: Apr. 22, 1998

[51] Int. Cl.[6] .......................... A47C 19/02; A47C 19/00; A47B 95/02

[52] U.S. Cl. ................................. 5/190; 5/703; 5/200.1; 5/658; 16/114 R; 16/124

[58] Field of Search ................ 5/703, 704, 658, 5/190, 200.1; 16/114 R, 124

[56] References Cited

U.S. PATENT DOCUMENTS

| | | | |
|---|---|---|---|
| 1,304,700 | 5/1919 | Otte | 16/124 |
| 2,793,386 | 5/1957 | Muhlhauser | 16/124 |
| 3,098,686 | 7/1963 | Benoit | 16/124 |
| 5,134,754 | 8/1992 | Vickers | 16/124 |
| 5,214,810 | 6/1993 | Ward | 5/703 |

FOREIGN PATENT DOCUMENTS

| | | | |
|---|---|---|---|
| 820754 | 9/1959 | United Kingdom | 16/124 |

*Primary Examiner*—Alexander Grosz
*Attorney, Agent, or Firm*—MacMillan, Sobanski & Todd, LLC

[57] ABSTRACT

A section of a bed has a mattress support grid comprising a plurality of intersecting wire segments. The intersecting were segments define an opening. A handle is engageable with the opening.

18 Claims, 5 Drawing Sheets

6,000,075

HANDLE ENGAGABLE WITH A GRID STRUCTURE

BACKGROUND OF THE INVENTION

The present invention relates to handling implements and more particularly, to a handle or grip for hand carrying a grid structure.

Handles and grips assist a user in negotiating articles of varying shapes, sizes and compositions. Handles are especially useful in handling articles that may otherwise be difficult, cumbersome or even hazardous to handle. Some handles are specifically provided to meet a particular purpose. Some handles are also uniquely structured and dimensioned to cooperate with particular articles.

Some articles, particularly parcels, have been configured to include handles. Some parcels are configured to include an integral handle. For example, it is well known to provide a parcel generally fabricated of a corrugated material, such as cardboard, having one or more integral handles. Cardboard parcels are known to have handles stamped in the cardboard. The parcels can be assembled in a manner such that the handle extends from the parcel. Alternatively, the handle may be substantially flush with the parcel's exterior and extensible at the option of the user. Such a configuration is more amenable to stacking and thus, is more adaptable to shipping and conserving inventory space.

Other parcels are configured to cooperate with separate handles formed of diverse materials. For example, it is known to provide a parcel having a pair of spaced slots. The slots are arranged and configured to receive opposed ends of a handle. The handle is generally a plastic handle having ends. The ends engage the slots and are subsequently turned ninety degrees to prevent the handles from escaping the slots. Although a plastic handle is most prominent, rope handles are also common. Rope handles typically include opposed ends. The ends pass through openings in the parcel and are knotted. The knots prevent the ends from escaping through the openings.

Another handle commonly associated with parcels is in the form of an opening in the parcel. A user can extend his or her fingers through the opening to grasp the parcel. The opening can be stamped into the parcel material. It is known to allow the openings to remain plugged until needed. This may be desirable to preserve or protect the contents of the parcel.

As set forth above, some handles or grips are uniquely configured for particular parcels. One area where a uniquely configured handle would be well suited is in the packaging and transport of beds, such as hospital beds. Hospital beds H, as shown in FIGS. 6 and 7, generally include a peripheral frame F and a supporting structure, such as legs L, for supporting the peripheral frame F on a supporting surface. The peripheral frame F supports a mattress support grid G. The mattress support grid G is generally formed of wire segments W. The wire segments W provide a rigid structure for supporting a mattress M, eliminating the need for a box spring. Conventional hospital beds H include sections, such as the head section S1 and the foot section S2 shown. The sections S1, S2 are pivotally attached relative to one another and the frame F so as to be movable relative to one another and to the frame F. For example, the head section S1 of a hospital bed H typically inclines. Moreover, the foot section S2 of a hospital bed generally elevates so as to raise the knees of the user in a bent knee orientation.

Hospital beds can be sectioned for packaging and shipping. The sections are assembled when they reach their destination. The parcels containing the sections can be heavy and can be cumbersome and uncomfortable to carry. A retrofit handle that cooperates with a hospital bed section would aid the user in handling and transporting the hospital bed section as a parcel. A handle that is engageable with hospital bed section in the form of a parcel would enable a carrier of the parcel to manage or control the parcel with greater ease.

SUMMARY OF THE INVENTION

The invention s directed to a section of a bed and a handle. The bed section has a mattress support grid comprising a plurality of intersecting wire segments. The intersecting wire segments define an opening. The handle is engageable with the opening.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
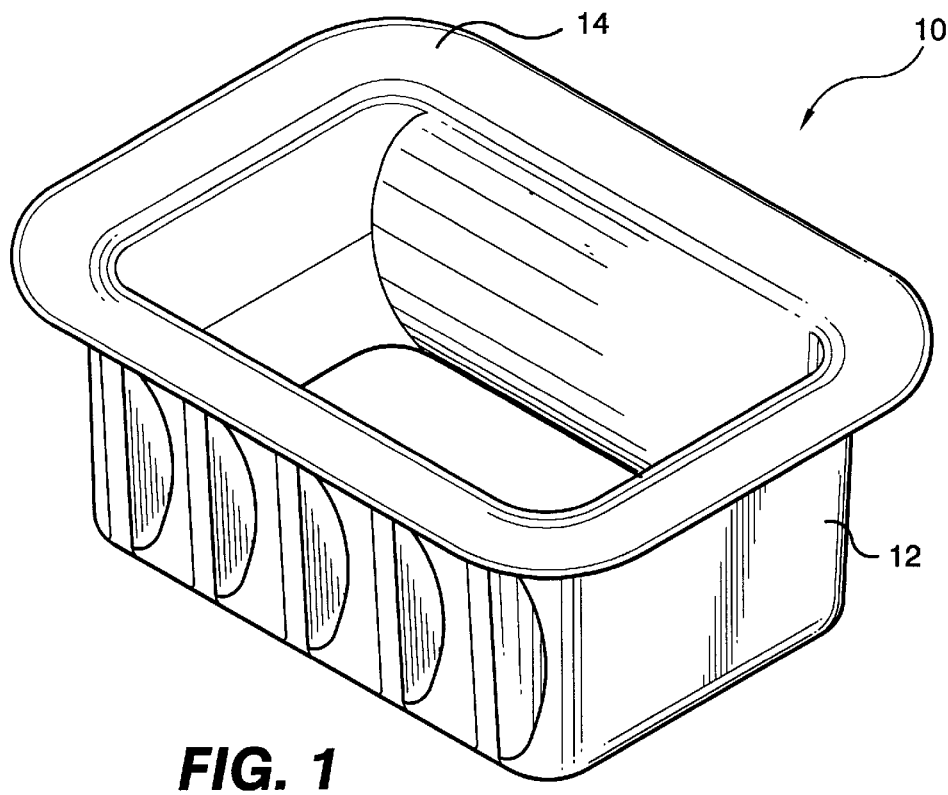
FIG. 1 is a front perspective view of a handle according to the present invention.
Figure 2:
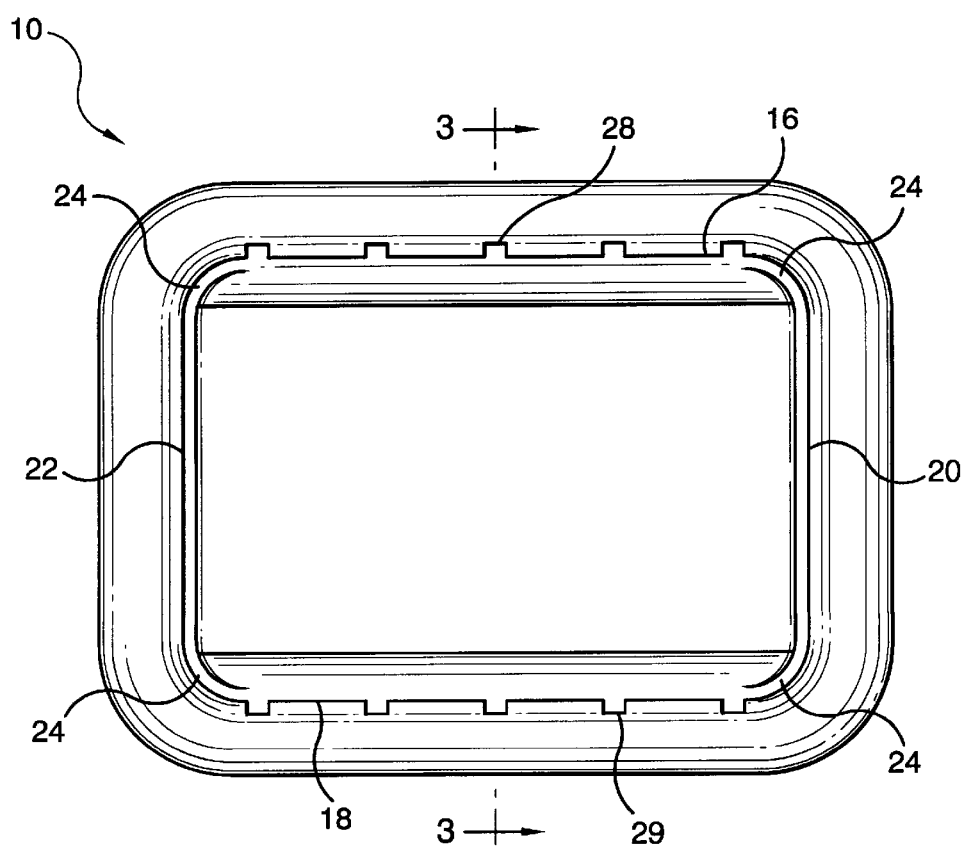
FIG. 2 is a rear elevation of the handle shown in FIG. 1.

Referring now to the drawings, there is illustrated in FIGS. 1 and 2 a handle or grip 10 according to the present invention. The handle 10 is engageable with wire segments W of a mattress support grid G of a bed, such as an articulating bed, such as the hospital bed H shown in FIGS. 6 and 7, or a bed for use in homecare. The handle 10 is for use in carrying the hospital bed H. The handle 10 comprises a main body 12 and an abutment surface, such as defined by the flange 14 shown, extending from the main body 12. The flange 14 can be a peripheral flange extending outwardly from the main body 12. The flange 14 is preferably perpendicular to the main body 12.

Figure 6:
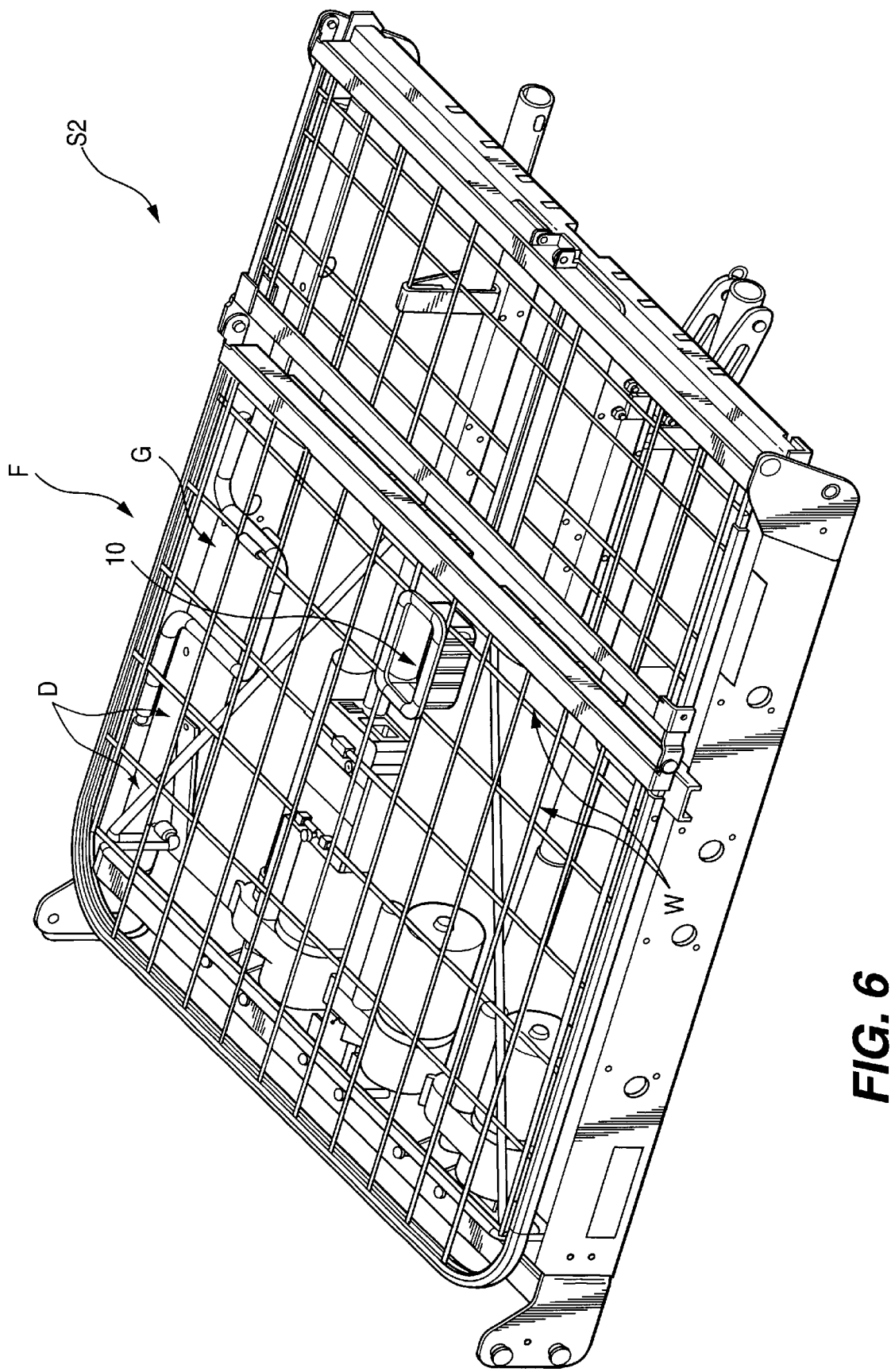
FIG. 6 is an environmental front perspective view of the handle engaged with the mattress support grid of a section of a hospital bed.
Figure 7:
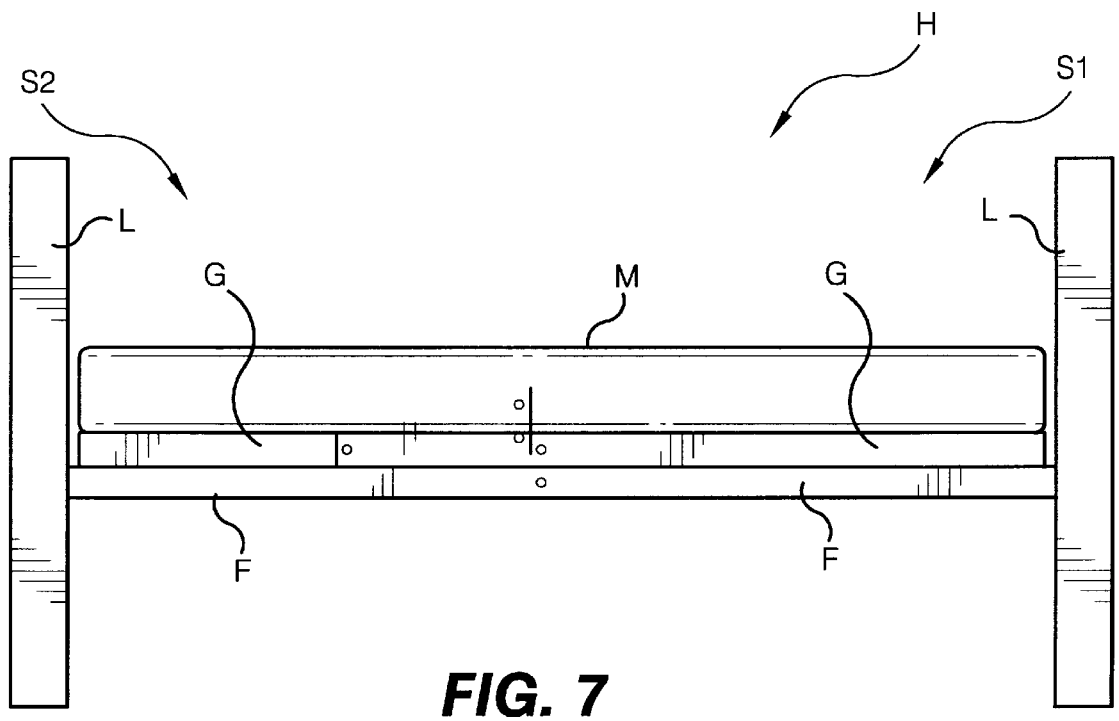
FIG. 7 is a side elevation of a hospital bed.

The main body 12 is preferably generally rectangular in shape because the wire segments W of the mattress support grid G of the hospital bed H define a rectangular opening O (shown in FIG. 6). The handle 10 is received by the rectangular opening O and includes a first wall 16 and a second wall 18 defining opposed outer contact surfaces that are engageable with the wire segments W.

Now continuing with reference to FIG. 2, the main body 12 comprises a generally rectangular peripheral wall 15. Although the main body 12 shown comprises a generally rectangular peripheral wall 15, it should be understood that the main body 12 may take on other shapes. The peripheral wall 15 is defined by the first wall 16, the second wall 18, and two side walls 20, 22. The first wall 16 and second wall 18 are joined to the side walls 20, 22 at four corners, generally indicated as 24. The four corners 24 are preferably rounded so as to reduce the risk of the handle 10 interfering with the wire segments W (shown in FIG. 6) upon engaging the handle 10 with the mattress support grid G (also shown in FIG. 6) and to provide greater comfort for the user.

Figure 3:
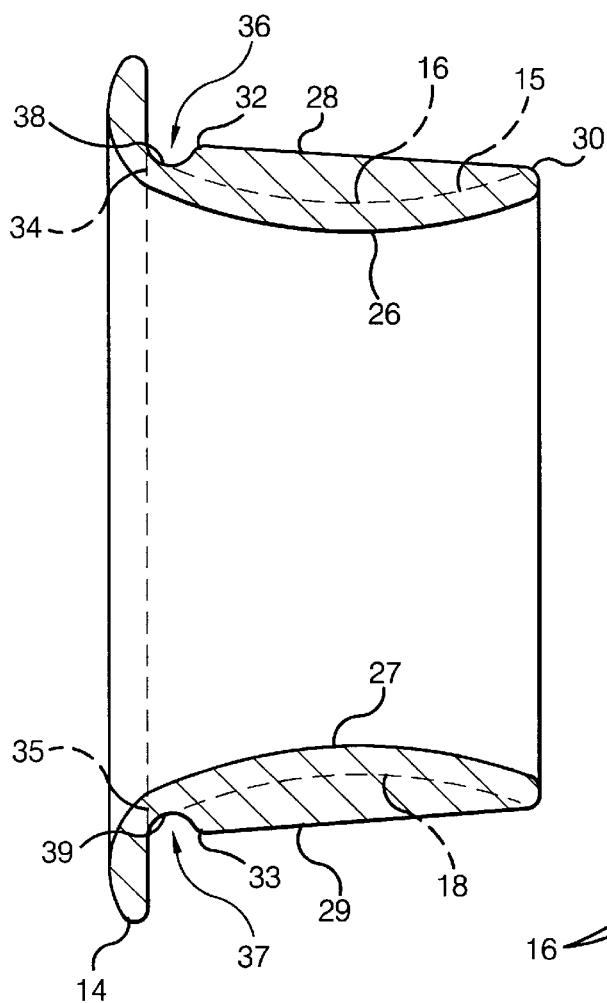
FIG. 3 is a cross-section of the handle taken along lines 3—3 in FIG. 2.

As shown in FIG. 3, the first wall 16 and the second wall 18 each can include an inwardly facing convex surface 26, 27. The inwardly facing convex surfaces 26, 27 provide a contact surface for the fingers of the user (not shown). The wire segments W1, W2 (clearly shown in FIGS. 4 and 5) are approximately 3/16 inch diameter and each section S1, S2 of the hospital bed H (shown in FIG. 7) can be very heavy. The inwardly facing convex surfaces 26, 27 protect the fingers of a user against direct contact with the wire segments W1, W2 and distribute the load of the sections S1, S2 of the hospital bed H.

A plurality of outwardly facing ramps 28, 29 extend from the first wall 16 and the second wall 18. Although a plurality of ramps 28, 29 are shown, it should be understood that a single ramp extending from either the first or second wall 16, 18 may suffice. The ramps 28, 29 extend laterally with respect to the first and second walls 16, 18. Each ramp 28, 29 includes a point of origin 30, 31 and a terminal end 32, 33. Each ramp 28, 29 progresses in elevation from the point of origin 30, 31 to the terminal end 32, 33. The terminal end 32 of each ramp 28 extending from the first wall 16 (hereinafter referred to as the "first ramps") terminates a predetermined distance from a forward edge 34 of the first wall 16. The terminal end 33 of each second ramp 29 extending from the second wall 18 (hereinafter referred to as the "second ramps") terminates a predetermined distance from a forward edge 35 of the second wall 18. A first channel 36 is defined between the peripheral flange 14 and the terminal ends 32 of the first ramps 28 and a second channel 37 is defined between the peripheral flange 14 and the terminal ends 33 of the second ramps 29. The first channel 36 has a concave surface 38 extending longitudinally along the first wall 16 adjacent the forward edge 34 of the first wall 16. The second channel 37 also has a concave surface 39 extending longitudinally along the second wall 18 adjacent the forward edge 35 of the second wall 18.

Figure 4:
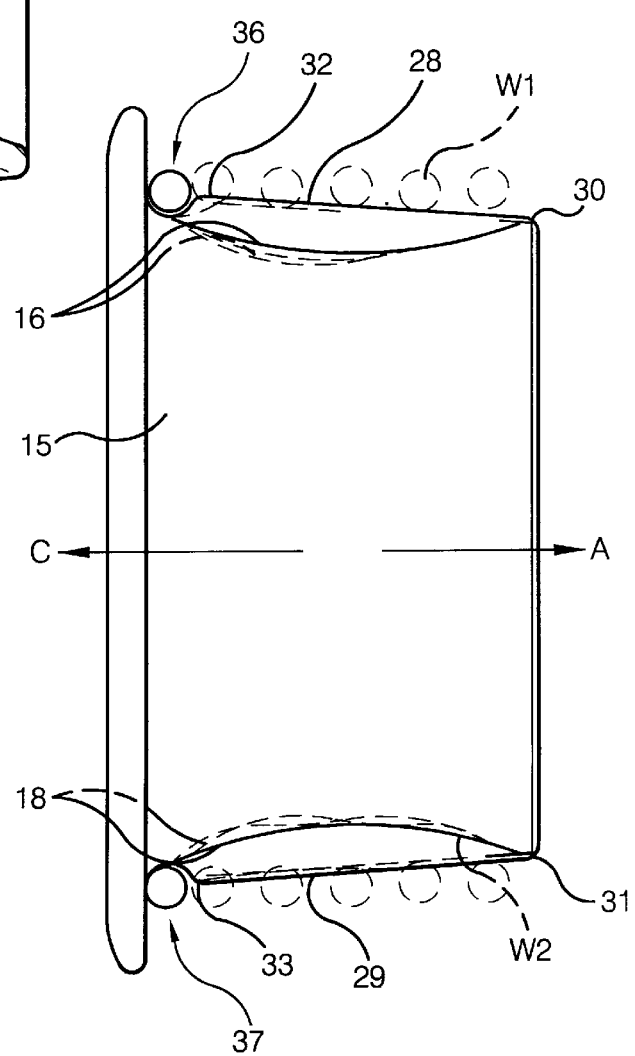
FIG. 4 is a diagrammatic representational view of the handle engaging a mattress support grid.

Referring now to FIG. 4, the peripheral wall 15 is dimensioned and configured to fit within an opening O defined by wire segments W of the mattress support grid G of a hospital bed (shown in FIG. 6). The handle 10 is engaged with the mattress support grid G by forcing the handle 10 into contact with the wire segments W1, W2 in the direction A. The distance between the points of origin 30 of the first ramps 28 and the points of origin 31 of the second ramps 29 is preferably less than the distance between the first wire segment W1 and the second wire segment W2. Hence, clearance is provided between the first ramp 28 and the first wire segment W1 and clearance is provided between the second ramp 29 and the second wire segment W2. As the handle 10 is moved in the direction A, the first wire segment W1 makes contact with the first ramp 28 and the second wire segment W2 makes contact with the second ramp 29. Either the ramps 28, 29, or the main body 12, or both, are at least slightly resilient. As a result, the first ramp 28 and/or the first wall 16 deforms and the second ramp 29 and/or the second wall 18 deforms as the handle 10 progresses in the direction A. The first wire segment W1 and the second wire segment W2 may likewise deform but deformation of the first wire segment W1 and the second wire segment W2 would likely be insignificant. As the handle 10 continues to move in the direction A, the force of the first wire segment W1 against the first ramp 28 and the force of the second wire segment W2 against the second ramp 29 becomes greater. A maximum force between the first wire segment W1 and the first ramp 28 and the second wire segment W2 and the second ramp 29 is reached when the first wire segment W1 reaches the terminal end 32 of the first ramp 28 and the second wire segment W2 reaches the terminal end 33 of the second ramp 29, respectively. The first ramp 28 and/or the first wall 16 and the second ramp 29 and/or the second wall 18 continue to deform until the first wire segment W1 reaches the first channel 36 and the second wire segment W2 reaches the second channel 37. A maximum amount of deformation is achieved when the first wire segment W1 reaches the terminal end 32 of the first ramp 28 and the second wire segment W2 reaches the terminal end 33 of the second ramp 29. It can be seen that the grid structure, namely, the mattress support grid G (see FIGS. 6 and 7), engages the opposed channels 36, 37 defined between the outer contact surfaces (defined by the first and second walls 16, 18) and the abutment surface 14.

Figure 5:
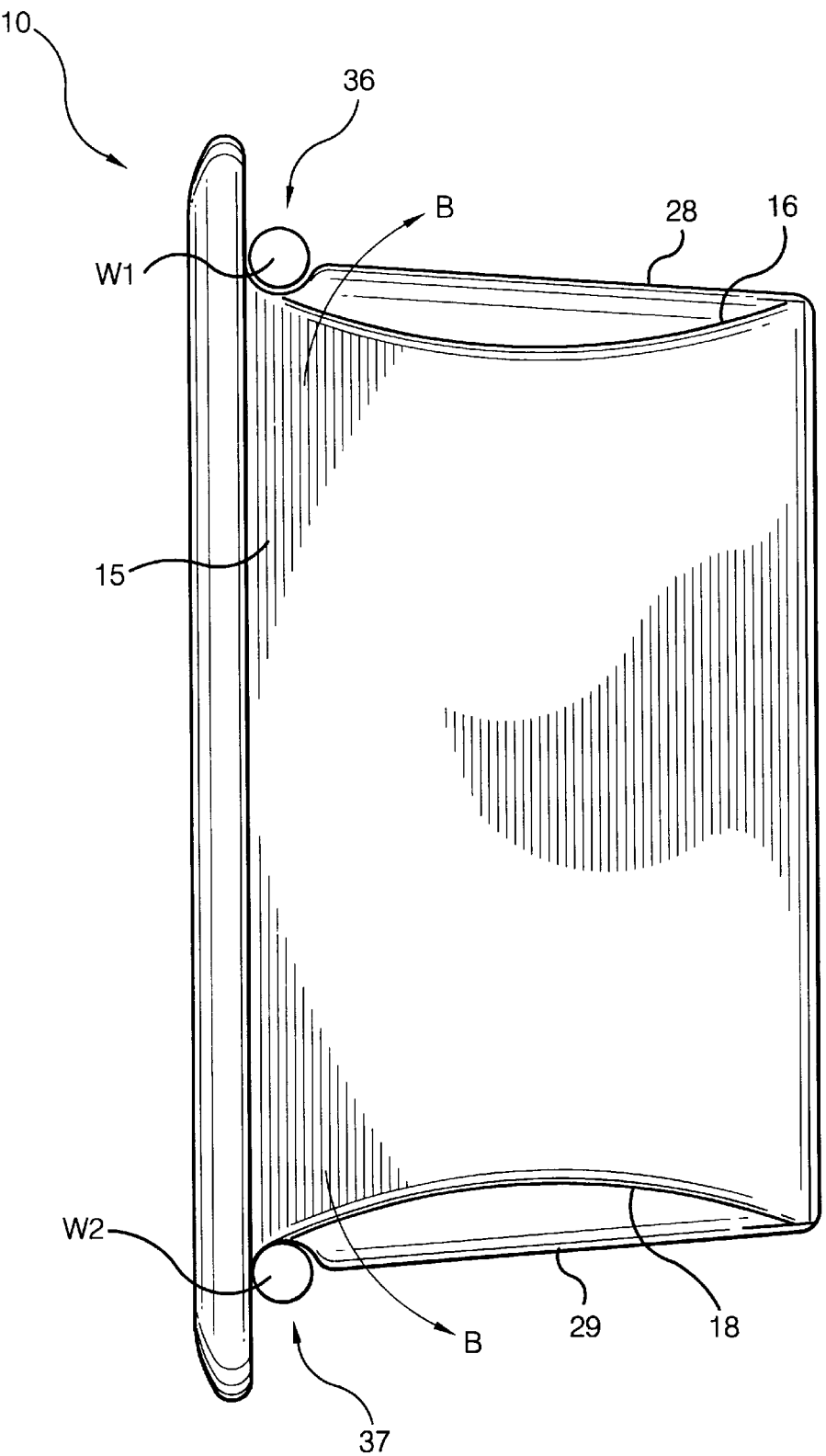
FIG. 5 is an enlarged view of the handle illustrating a channel in the handle for receiving a wire segment of a mattress support grid of a hospital bed.

As shown in FIG. 5, when the first wire segment W1 reaches the first channel 36 and the second wire segment W2 reaches the second channel 37, the first wire segment W1 is trapped in the first channel 36 and the second wire segment W2 is trapped in the second channel 37. A snap engagement is achieved because the first ramp 28 and/or the first wall 16 and the second ramp 29 and/or the second wall 18 of the handle 10 have a memory component. As a result of the memory component, the first ramp 28 and/or the first wall 16 and the second ramp 29 and/or the second wall 18 of the handle 10 return from their deformed position to an initial position in the direction, generally indicated as B, when the first and second wire segments W1, W2 reach the first and second channels 36, 37, respectively.

Continuing with reference to FIG. 5, the channels 36, 37 are each dimensioned and configured to snugly receive the wire segments W1, W2 of the mattress support grid G (shown in FIG. 6). This snug fit configuration reduces the risk of the handle 10 becoming disengaged with the mattress support grid G. Further, the snug fit configuration reduces the risk of the handle 10 moving relative to the mattress support grid G and thus provides greater control of the mattress support grid G with the handle 10.

Figure 8:
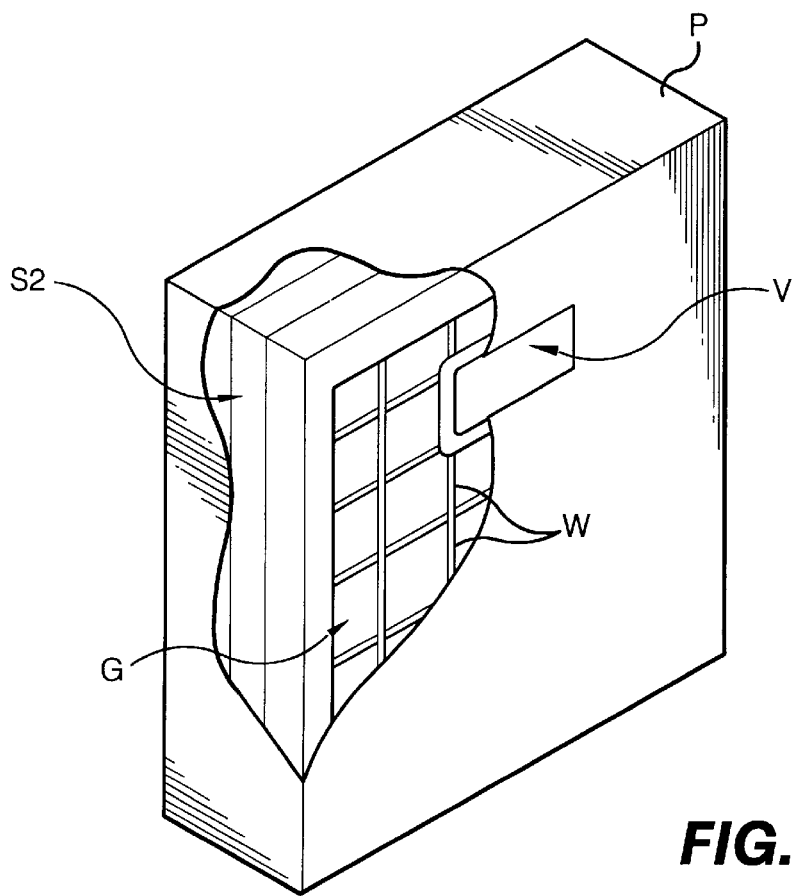
FIG. 8 is a front perspective view of a section of a hospital bed enclosed in parcel packaging.

It is contemplated that the handle 10 be used in cooperation with parcel packaging P, such as a corrugated box or cardboard material covering (shown in FIG. 8). A hospital bed H can be sectioned into sections, such as the head section S1 and the foot section S2 shown in FIG. 7. Each section S1, S2 includes a mattress grid support G and a frame F. The mattress grid support G of each section S1, S2 is attached to a respective frame section F. The hospital bed H is generally shipped in sections, such as by shipping the head section S1 and the foot section S2 independently. Each section S1, S2 is preferably shipped in parcel packaging P. It is preferable that the parcel packaging P includes at least one opening, such as a view opening V. The view opening V may be positioned to co-align with the opening O defined by the wire segments W of the mattress support grid G and the handle 10 engaged with the mattress support grid G.

Referring now back to FIG. 4, the first and second wire segments W1, W2 can be released from the first and second channels 36, 37, respectively, by removing the handle 10. This is accomplished by moving the handle 10 in the direction C. Initial disengagement of the handle 10 requires sufficient force to overcome inference offered by the terminal ends 32, 33 of the first ramps 28 and second ramps 29, respectively. As set forth above, the first wall 16 and the second wall 18 will deform to enable the first wire segment W1 and the second wire segment W2 to overcome the terminal ends 32, 33 of the first ramps 28 and the second ramps 29, respectively. Upon removal of the handle 10, the handle 10 can be discarded. Alternatively, the handle 10 can be returned to the manufacturer of the hospital bed and reused in future shipments. The handle 10 may also remain engaged with the mattress support gird G. Since the handle 10 remains substantially flush with the mattress support gird G, the handle 10 will not interfere with a mattress M being supported by the mattress support gird G (shown in FIG. 7).

It should be understood that the handle 10 is structured and dimensioned to provide a comfortable grip for the user. The handle 10 can be received by a variety of openings O (shown in FIG. 4) defined by the wire segments W (also shown in FIG. 4) of the mattress support grid G. This enables the user of the handle 10 to position the handle 10 so as to distribute the weight of the hospital bed H in a manner suitable for the user. It also enables the user to position the handle 10 at a location most suitable for his or her particular anatomy. For example, a tall user, or a user having long arms, may position the handle 10 in the mattress support grid G at a location suitable to that user, while a shorter user may position the handle 10 at an entirely different location suitable for that user.

It should also be understood that the handle 10 should be composed of a material sufficiently strong to support the hospital bed upon lifting the hospital bed. A thermoplastic elastomer, such as Santoprene of Monsanto Company of St. Louis, Mo., has been found to provide a comfortable grip for the user and provide sufficient rigid support to carry a hospital bed section.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. In combination:
a section of a bed comprising a mattress support grid comprising a plurality of intersecting wire segments defining at least one opening; and
a handle engageable with said opening.

2. The combination according to claim 1, wherein
said bed section comprises a mattress support grid having opposed wire segments,
said handle comprises:
a main body comprising opposed outer contact surfaces engageable with said opposed wire segments of said mattress support grid of said bed section,
an abutment surface extending from said main body proximate each one of said opposed contact surfaces, said abutment surface for restricting travel of said handle relative to said opposed wire segments of said mattress support grid, and
a channel formed between each one of said opposed surfaces and a respective one of said abutment surfaces, said opposed wire segments of said mattress support grid being engageable with said channels.

3. The combination according to claim 2, further comprising:
a peripheral flange; and wherein
said main body further comprises a peripheral wall having opposed walls, said opposed contact surfaces being defined at least in part by said opposed walls, said peripheral wall being dimensioned to fit within a portion of said mattress support grid, said peripheral flange extending outwardly and perpendicularly from said peripheral wall, each one of said abutment surfaces being defined at least in part by said peripheral flange.

4. The combination according to claim 3, wherein
each one of said opposed walls further comprises a ramp, said opposed outer contact surfaces being defined by said ramps, each one of said ramps having a point of origin and a terminal end opposite said point of origin, each one of said ramps being inclined in elevation from said point of origin to said terminal end, each one of said ramps comprising a resilient material so as to deform upon contact with said opposed wire segments of said mattress support grid and return to a non-deformed state upon termination of contact with said opposed wire segments of said mattress support grid, one of said channels being formed between said terminal end of a respective one of said ramps and said peripheral flange.

5. The combination according to claim 2, wherein
each one of said channels comprises a concave surface dimensioned to engage opposed wire segments of the mattress support grid.

6. The combination according to claim 2, wherein
said main body includes opposed inner convex contact surfaces to provide a comfortable grip for a user of said handle.

7. In combination:
at least one section of a bed comprising a mattress support grid comprising a plurality of intersecting wire segments defining a plurality of generally rectangular openings; and
a generally rectangular handle removably engaging at least one of said openings.

8. The combination according to claim 7, wherein
said bed section comprises a mattress support grid having opposed wire segments,
said handle comprises:
a main body comprising opposed outer contact surfaces engageable with said opposed wire segments of said mattress support grid of said bed section,
an abutment surface extending from said main body proximate each one of said opposed contact surfaces, said abutment surface for restricting travel of said handle relative to said opposed wire segments of said mattress support grid, and
a channel formed between each one of said opposed surfaces and a respective one of said abutment surfaces, said opposed wire segments of said mattress support grid being engageable with said channels.

9. The combination according to claim 8, further comprising:
a peripheral flange; and wherein
said main body further comprises a peripheral wall having opposed walls, said opposed contact surfaces being defined at least in part by said opposed walls, said peripheral wall being dimensioned to fit within a portion of said mattress support grid, said peripheral flange extending outwardly and perpendicularly from said peripheral wall, each one of said abutment surfaces being defined at least in part by said peripheral flange.

10. The combination according to claim 9, wherein each one of said opposed walls further comprises a ramp, said opposed outer contact surfaces being defined by said ramps, each one of said ramps having a point of origin and a terminal end opposite said point of origin, each one of said ramps being inclined in elevation from said point of origin to said terminal end, each one of said ramps comprising a resilient material so as to deform upon contact with said opposed wire segments of said mattress support grid and return to a non-deformed state upon termination of contact with said opposed wire segments of said mattress support grid, one of said channels being formed between said terminal end of a respective one of said ramps and said peripheral flange.

11. The combination according to claim 8, wherein each one of said channels comprises a concave surface dimensioned to engage opposed wire segments of the mattress support grid.

12. The combination according to claim 8, wherein said main body includes opposed inner convex contact surfaces to provide a comfortable grip for a user of said handle.

13. In combination:

at least a section of a bed comprising a mattress support grid comprising a plurality of intersecting wire segments defining a plurality of generally rectangular openings;

a generally rectangular handle removably engaging at least one of said generally rectangular openings; and a box for receiving said bed section and said handle engaging said bed section.

14. The combination according to claim 13, wherein said bed section comprises a mattress support grid having opposed wire segments, said handle comprises:
 a main body comprising opposed outer contact surfaces engageable with said opposed wire segments of said mattress support grid of said bed section,
 an abutment surface extending from said main body proximate each one of said opposed contact surfaces, said abutment surface for restricting travel of said handle relative to said opposed wire segments of said mattress support grid, and
 a channel formed between each one of said opposed surfaces and a respective one of said abutment surfaces, said opposed wire segments of said mattress support grid being engageable with said channels.

15. The combination according to claim 14, further comprising:

a peripheral flange; and wherein said main body further comprises a peripheral wall having opposed walls, said opposed contact surfaces being defined at least in part by said opposed walls, said peripheral wall being dimensioned to fit within a portion of said mattress support grid, said peripheral flange extending outwardly and perpendicularly from said peripheral wall, each one of said abutment surfaces being defined at least in part by said peripheral flange.

16. The combination according to claim 15, wherein each one of said opposed walls further comprises a ramp, said opposed outer contact surfaces being defined by said ramps, each one of said ramps having a point of origin and a terminal end opposite said point of origin, each one of said ramps being inclined in elevation from said point of origin to said terminal end, each one of said ramps comprising a resilient material so as to deform upon contact with said opposed wire segments of said mattress support grid and return to a non-deformed state upon termination of contact with said opposed wire segments of said mattress support grid, one of said channels being formed between said terminal end of a respective one of said ramps and said peripheral flange.

17. The combination according to claim 14, wherein each one of said channels comprises a concave surface dimensioned to engage opposed wire segments of the mattress support grid.

18. The combination according to claim 14, wherein said main body includes opposed inner convex contact surfaces to provide a comfortable grip for a user of said handle.

* * * * *